US011743150B2

(12) United States Patent
Mishra

(10) Patent No.: US 11,743,150 B2
(45) Date of Patent: Aug. 29, 2023

(54) AUTOMATED ROOT CAUSE ANALYSIS OF UNDERPERFORMING VIDEO STREAMS BY USING LANGUAGE TRANSFORMERS ON SUPPORT TICKET SYSTEMS

(71) Applicant: iStreamPlanet Co., LLC, Las Vegas, NV (US)

(72) Inventor: Nachiketa Mishra, Fremont, CA (US)

(73) Assignee: iStreamPlanet Co., LLC, Las Vegas, NV (US)

(*) Notice: Subject to any disclaimer, the term of this patent is extended or adjusted under 35 U.S.C. 154(b) by 0 days.

(21) Appl. No.: 17/327,666

(22) Filed: May 21, 2021

(65) Prior Publication Data

US 2022/0376994 A1  Nov. 24, 2022

(51) Int. Cl.
| | |
|---|---|
| H04L 12/24 | (2006.01) |
| H04L 41/50 | (2022.01) |
| G06N 20/00 | (2019.01) |
| H04L 41/5041 | (2022.01) |
| H04L 41/5009 | (2022.01) |
| H04L 41/5074 | (2022.01) |
| H04L 41/0695 | (2022.01) |

(52) U.S. Cl.
CPC ........... *H04L 41/509* (2013.01); *G06N 20/00* (2019.01); *H04L 41/0695* (2013.01); *H04L 41/5009* (2013.01); *H04L 41/5048* (2013.01); *H04L 41/5074* (2013.01)

(58) Field of Classification Search
CPC ............... H04L 41/509; H04L 41/5074; H04L 41/5009; H04L 41/5048; H04L 41/0695; G06N 20/00
See application file for complete search history.

(56) References Cited

U.S. PATENT DOCUMENTS

| | | | |
|---|---|---|---|
| 11,163,731 B1* | 11/2021 | Riddell | G06F 7/5443 |
| 2008/0298448 A1* | 12/2008 | Erman | H04L 65/80 |
| | | | 375/226 |
| 2009/0055684 A1* | 2/2009 | Jamjoom | G06F 11/0709 |
| | | | 714/26 |
| 2019/0163594 A1* | 5/2019 | Hayden | G06F 11/2257 |
| 2019/0182105 A1* | 6/2019 | Stephens | H04L 67/125 |
| 2019/0347148 A1* | 11/2019 | Gomes Pereira | G06F 11/079 |
| 2020/0162312 A1* | 5/2020 | Balasubramanian | ........ |
| | | | H04L 41/069 |

(Continued)

OTHER PUBLICATIONS

ETSI TR 101 290 V1.4.1, "Digital Video Broadcasting (DVB); Measurement guidelines for DVB systems," Jun. 2020, pp. 1-174.

(Continued)

*Primary Examiner* — Shean Tokuta
*Assistant Examiner* — Juan C Turriate Gastulo
(74) *Attorney, Agent, or Firm* — Nicholson De Vos Webster & Elliott LLP

(57) ABSTRACT

A method and system corrects a content delivery infrastructure. The method of the system includes receiving a request to resolve reported issues for the content delivery infrastructure, collecting content delivery metrics for the content delivery infrastructure, executes a language transformer model on the request and the content delivery metrics to generate a set of possible resolutions with confidence ratings, and implementing an automated solution based on a resolution from the set of possible resolutions, in response to the resolution having a confidence rating above a threshold.

22 Claims, 6 Drawing Sheets

(56) References Cited

U.S. PATENT DOCUMENTS

| | | | |
|---|---|---|---|
| 2020/0304364 A1* | 9/2020 | Tapia | H04L 41/5067 |
| 2020/0351698 A1* | 11/2020 | Li | H04L 65/80 |
| 2022/0086529 A1* | 3/2022 | Gowda | H04N 21/4666 |

OTHER PUBLICATIONS

EY Global, "Test Intelligence demo: Defect Root Cause Analysis using NLP," Apr. 15, 2020, https://www.youtube.com/watch?v=x2Lz0dtYNJw, pp. 1-24.

Löfgren, J., "Data Mining of Trouble Tickets for Automatic Action Recommendation," Uppsala University, Feb. 2017, https://uu.diva-portal.org/smash/get/diva2:1079257/FULLTEXT01.pdf, pp. 1-36.

Sun, et al., "How to automatically resolve trouble tickets with machine learning," Ericsson Blog, Oct. 16, 2020, https://www.ericsson.com/en/blog/2020/10/how-to-resolve-trouble-tickets-machinelearning, pp. 1-12.

* cited by examiner

AUTOMATED ROOT CAUSE ANALYSIS OF UNDERPERFORMING VIDEO STREAMS BY USING LANGUAGE TRANSFORMERS ON SUPPORT TICKET SYSTEMS

TECHNICAL FIELD

The embodiments of the invention are related to the field of diagnosis and correction of managing video and image content. More specifically, the embodiments of the invention relate to methods and systems for processing reported content delivery issues using machine learning and determining a cause and correction for the reported issues.

BACKGROUND ART

Content delivery and content delivery systems can stream content (e.g., audio, video, augmented reality, virtual reality, and similar content) to any number of user devices running client applications that consume (e.g., play, display, or similarly output) this content. In the case of video streaming, there are many technologies related to the delivery of video streams are defined by various standards such as the standards of digital video broadcasting (DVB). DVB standards are maintained by the DVB Project, an international industry consortium, and are published by a Joint Technical Committee (JTC) of the European Telecommunications Standards Institute (ETSI), European Committee for Electrotechnical Standardization (CENELEC) and European Broadcasting Union (EBU). Video streaming and similar technologies can be transmitted over a variety of media including satellite, cable, terrestrial television, microwave and similar media.

Standards, such as the DVB standards, for the distribution of video streams can define the physical layer and data link layer of the distribution system. Video data is transmitted in defined formats such as motion pictures experts group (MPEG) transport streams. Video streams can be encoded using various discrete cosine transform (DCT) based encoding standard, such as, H.26x, MPEG and similar encoding schemes. Audio for the video streams can be encoded using modified DCT (MDCT) standards including advanced audio coding (AAC), Dolby Digital (AC-3), MP3 and similar encoding formats.

DVB and similar standards can also define standards for measurement of analysis for transport streams, such as ETSI technical report (TR) 101 290 (herein after "ETR 101"). Transport stream measurement and analysis standards such as ETR 101 can define how metrics and errors in the transport stream are reported and managed. However, these standards have limitations in the information provided and do not provide any predictive indication of video stream stability or characteristics.

Similarly, there are many different technologies related to augmented reality, mixed reality, virtual reality and similar extended reality content. These technologies can stream virtual content to user devices that is used to replace or augment real-world environments via the displays and feedback mechanisms of the user devices. Two and three-dimensional objects, audio, video, and similar content can be streamed to user devices and displayed or output to users to partially or completely simulate experiences in conjunction with or in place of the real-world surrounds of the user. In all of these content delivery scenarios, interruption, latency, or low throughput of the infrastructure delivering the content can provide a sub-optimal user experience.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
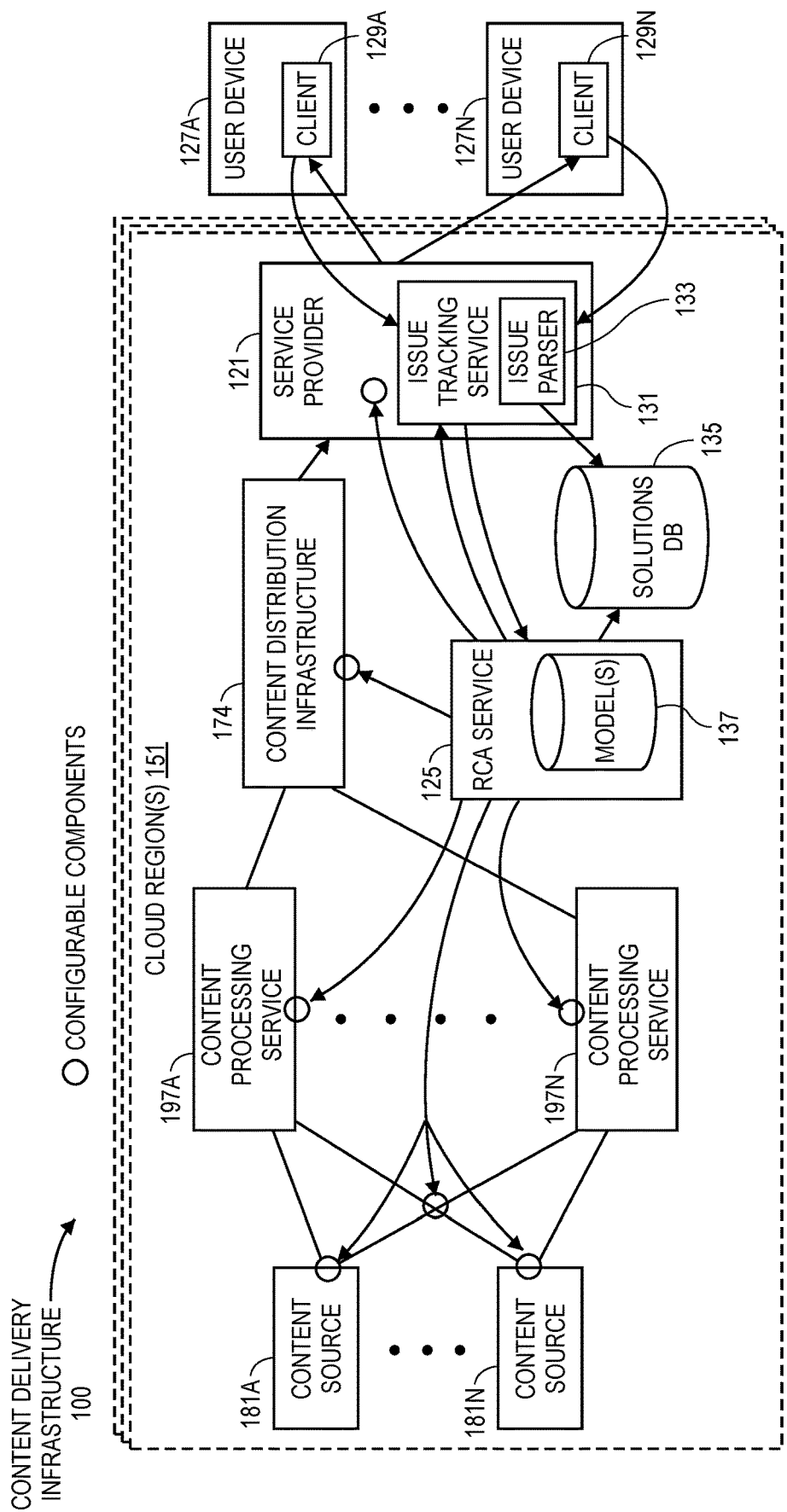
FIG. 1 is a diagram of one embodiment of a content delivery infrastructure including an issue tracking service and root cause analysis service.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Content Delivery Infrastructure in a Cloud Computing Environment

FIG. 1 is a first embodiment of a content delivery infrastructure in a cloud computing environment. The cloud computing environment can include a set of cloud regions 151. A 'set,' as used herein can refer to any whole number of items including one item. These cloud regions 151 can be different cloud computing environments provided by a same or different cloud computing provider. The cloud regions 151 can have different geographic locations and electronic device components and resources that are interconnected via communication networks with the other cloud regions 151. Any number, configuration, and variety of cloud computing environments and regions 151 can be utilized to provide the content delivery infrastructure 100. Any combination of the components of the content delivery infrastructure 100 can be included any one or more of the cloud regions 151. In some embodiments, any one or more of the components of the content delivery infrastructure 100 can also be external to any of the cloud regions 151.

In an example embodiment, the content delivery infrastructure 100 includes a set of content sources 181A-N, a set of content processing services 197A-N, a content distribution infrastructure 174, a set of service providers 121, a root cause analysis (RCA) service 125, a set of user devices 127A-N, and similar or supporting components. Content sources 181A-N can be any type of content input in any format that is provided by any source device or set of devices. For example, content sources 181A-N can be provided by a set of content providers, which are sets of devices operated by an entity that produces a content source to be processed and distributed by the content delivery infrastructure 100. Content sources can be any type of live or real-time delivered content such as video sources, virtual or augmented reality content, audio content (e.g., radio, music, or audiobooks), or similar content. In some cases, the content sources 181A-N can be provided directly or indirectly by a set of servers, capture sensors or devices (e.g., generating or capturing live input), or similar content sources.

The content sources 181A-N can be part of or external to the cloud regions 151. The content sources 181A-N can connect to or within the cloud regions 151 with other components including the content processing services 197A-N and RCA service 125 using any number or variety of communication channels and technologies. The content sources 181A-N can include configurable components that can be adjusted by the RCA service 125 in scenarios where the RCA service 125 determines that content delivery is being interrupted at the content sources 181A-N. Any combination and variety of settings can be configurable by the RCA service 125. The settings can manage format, quality, communication protocols, connection types, connection capacities or characteristics, and similar settings.

The content provided by the content source 181A-N can be received by and processed by a set of content processing services 197A-N. The content processing services 197A-N can be composed of any number and combination of electronic devices including servers, storage devices, networking devices and related devices resources that make up a cloud or similar distributed computing environment. The content processing services 197A-N can include multiple levels of content processing and related functions. The content processing services 197A-N can be implemented by a set of processors that can operate on the input content sources 181A-N. These processors can be software components that process the incoming content sources 181A-N and are hosted by any type or distribution of electronic devices. The processors can perform tasks associated with each content source 197A-N to process that content source and can be considered as a separate stage or can be combined with other stages of the content delivery infrastructure 100. Each processor of the content processing service 197A-N can perform a single task or multiple tasks and can operate in conjunction with other processes or stages in the content processing services 197A-N. The content processing services can implement transformations, transcodings, quality assessments, publishing, channel organization, and similar functions on the set of content sources 181A-N as well as perform any number of other processing tasks. Any number of the processors in the content processing service 197A-N can support any number and variety of content source 181A-N processing functions.

The content processing services 197A-N can be part of or external to the cloud regions 151. The content processing services 197A-N can connect to or within the cloud regions 151 with other components including the content sources 181A-N, content distribution infrastructure 174, and RCA service 125 using any number or variety of communication channels and technologies. The content processing services 197A-N can include configurable components that can be adjusted by the RCA service 125 in scenarios where the RCA service 125 determines that content delivery is being interrupted or slowed at the content processing services 197A-N. Any combination and variety of settings can be configurable by the RCA service 125. The settings can manage format, quality, communication protocols, connection types, connection capacities, functional characteristics, processing sequences and functions, and similar settings.

The content distribution infrastructure 174 can be implemented by a set of electronic device resources including servers, storage devices, and networking devices that support any number of content delivery streams that are to be published or distributed to the set of service providers 121 or in some cases returned to an origin server (e.g., a content source or other entity that may publish the content). The content distribution infrastructure can include any number and variety of components that enable the distribution of the processed content to the set of service providers 121. The content distribution infrastructure 174 can be composed of any number and combination of electronic devices including servers, storage devices, networking devices and related devices resources that are present a cloud or similar distributed computing environment.

The content distribution infrastructure 174 can include configurable components that can be adjusted by the RCA service 125 in scenarios where the RCA service 125 determines that content delivery is being interrupted or slowed at the content distribution infrastructure 174. Any combination and variety of settings can be configurable by the RCA service 125. The settings can manage format, quality, communication protocols, connection types, connection capacities, functional characteristics, processing sequences and functions, and similar settings.

The content distribution infrastructure 174 can provide the content to a set of service providers 121 that are implemented by a set of electronic device resources including servers, storage devices, and networking devices that support any number of content delivery streams that are to be published or distributed to the set of user devices 127A-N executing clients 129A-N that consume the content. The service providers 121 can include any number and variety of components that enable the distribution of the processed content to the set of user devices 127A-N. The service provider 121 can be composed of any number and combination of electronic devices including servers, storage devices, networking devices and related devices resources that are present in a cloud or similar distributed computing environment. In some embodiments, the set of service providers 121 are present in a separate cloud region 151 or external to the cloud regions 151. The service providers 121 can have a subscription or similar service arrangement with the users of the user devices 127A-N to provide the content via the clients 129A-N. The clients 129A-N are any number or variety of applications that are capable of displaying, rendering, transmitting, or similarly outputting the content for the user via the capabilities of the user devices 127A-N. In some embodiments, aspects of the clients 129A-N can execute at the suer devices 127A-N and/or the service providers 121 or intermediate nodes.

The service providers 121 can include issue tracking services 131. The issue tracking services 131 can receive input from service provider user or administrators, clients 129A-N, intermediate nodes, and similar sources where the inputs report issues in the quality or characteristics of the content being provided by the service provider 121. For example, the administrators of a service provider 121 can notice low quality or jittery streaming video content, content delivery latency, improper encoding, or similar issues with the content being sent to the user devices 127A-N or being received from the content distribution infrastructure 174. These input reports can be initially parsed by an issue parser. The input reports can have any format, content, or issue description methodology. The issue parser can perform a natural language transformation, or similar transformation, to parse the input and generate a standardized or normalized description of the reported issue. These issues can then be tracked by the issue tracking service 131. The issue tracking service 131 can track frequency, types, severity, and similar characteristics of the issues that are reported. In addition, the issue tracking service 131 can query a solutions database 135 (e.g., a ZenDesk database) or solutions service using the normalized issue generated by the issue parser 133 or collections of such issues. The solutions database 135 or service can return a set of possible solutions or recommendations to the issue tracking service 131. These solutions or recommendations would require manual administrative implementation at the service provider 121 or may indicate issues that are beyond the control of the service provider 121. These solutions or any subset thereof can be provided to the RCA service 125 for analysis and correction. The RCA service 125 includes a set of models 137 that are trained for identifying an originating or 'root' cause of a content delivery problem. These models can be trained on content delivery infrastructure metrics, solutions or recommendations, and similar inputs to enable the RCA service 125 to predict a best solution for a given issue as well as enable the RCA service 125 to implement that solution via the configurable components and settings exposed to the RCA service 125 in the content delivery infrastructure 100. The training of the models 137 and the predictions of the models 137 can utilize content delivery metrics such as video quality assessment (VQA), video transport stability, and similar metrics that are assessed at any number and variety of locations in the content delivery infrastructure 100 and each provide a measure or indication of the operation of the components of the content delivery infrastructure 100 as they respectively perform tasks to deliver content. Content delivery metrics can include network metrics and edge server metrics. Network metrics measure network bandwidth, latency, paths taken by packets, packet loss rate, and similar metrics. Network metrics provide indicators for network health (i.e., the proper function of devices in the network) and can help identify low latency high throughput network elements. Edge server metrics track edge server health (i.e., the proper function of devices at or near the edge servers. Edge server metrics can include server bandwidth, processing time, latency in serving content, and other similar metrics that can help assess edge server performance In addition, content delivery metrics can include error logs (e.g., from the content deliver network or other areas, routing metrics, content transcoding metrics, compression metrics, and similar metrics that can help in measuring the health (i.e., proper operation) of the content delivery infrastructure 100. Any number or combination of these metrics can be used as features for the RCA services to provide accurate training, and predictions, as well as explainability with a higher confidence. Numerical content delivery metrics can be normalized to enable equal weighting for each metric when used as a feature. In other embodiments, any of the metrics can be given a greater or lesser weighting relative to other metrics to increase or decrease the importance of those metrics. Where the collected content delivery metrics include text or similar content (e.g., error logs or other network logs), then the text can be converted to a higher order multidimensional input (e.g., using unsupervised neural networks (e.g., Autoencoders, Word2Vec, or similar functions)) to convert the text to numerical vectors that can be input as features for the RCA services 125. Including these content delivery metrics in the modeling and configuration of the RCA services 125 enables the models 137 to predict and apply solutions that identify specific components and configuration settings in the content delivery infrastructure 100 to be corrected.

The service provider 12 can also include configurable components that can be adjusted by the RCA service 125 in scenarios where the RCA service 125 determines that content delivery is being interrupted or slowed at the service provider 121. Any combination and variety of settings can be configurable by the RCA service 125. The settings can manage format, quality, communication protocols, connection types, connection capacities, functional characteristics, processing sequences and functions, and similar settings.

Video Streaming System in a Cloud Computing Environment

Figure 2:
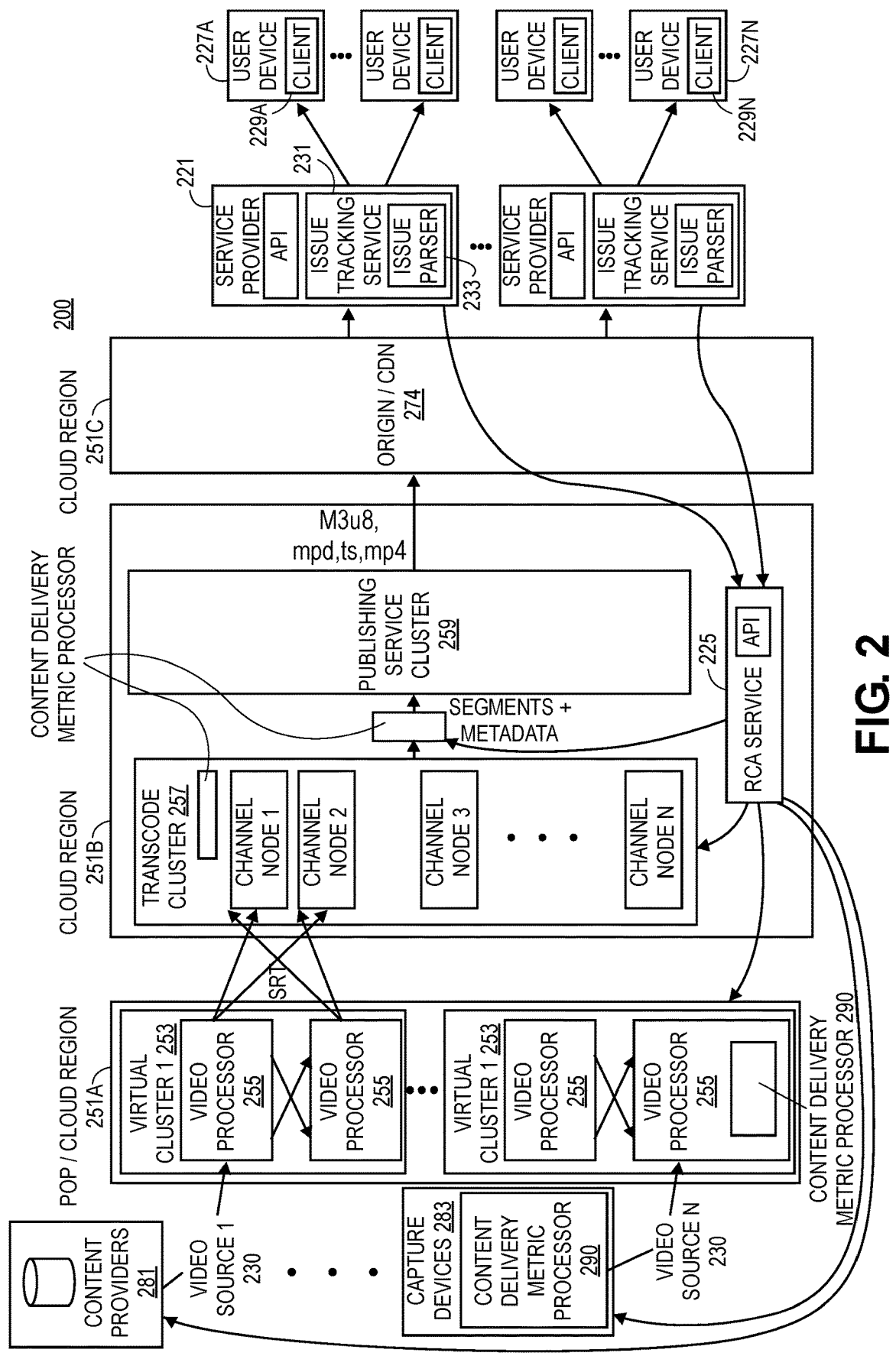
FIG. 2 is a diagram of one embodiment of a video streaming delivery infrastructure including an issue tracking service and root cause analysis service.

FIG. 2 is a first embodiment of a video streaming system to support RCA services in a cloud computing environment. The video streaming system is provided by way of example and not limitation. Those skilled in the art would appreciate that the embodiments are applicable to other similar examples of content delivery infrastructures.

The cloud computing environment can include a set of cloud regions 251A-C. These cloud regions can be different cloud computing environments provided by a same or different cloud computing provider. The cloud regions 251A-C can have different geographic locations and electronic device components and resources that are interconnected via communication networks with the other cloud regions 251A-C. Any number, configuration, and variety of cloud computing environments and regions 251A-C can be utilized to provide the video streaming system 200. In some embodiments, some of the components of the video streaming system 200 are located in a set of electronic devices referred to as a point of presence (POP). The POP 251A can be provided by an internet service provider or similar interface through which external resources and electronic devices can interact with the cloud computing environment.

In an example embodiment, the video streaming system 200 includes, set of virtual clusters 153, a transcode cluster 157, and a publishing service cluster 159. In further embodiments additional stages can included such as a pre-processing stage. The pre-processing stage can be composed of any number and combination of electronic devices including servers, storage devices, networking devices and related devices that make up a cloud or similar distributed computing environment. The pre-processing stage can support a set of processors that can operate on the input video sources 230. These processors can be software components that process the incoming video sources 230 and are hosted by any type or distribution of electronic devices. The processors can perform tasks associated with each video source 230 to process that video source and can be considered as a separate stage or can be combined with other stages of the video streaming system 200. Each processor of the stage can perform a single task or multiple tasks and can operate in conjunction with other processes to pre-process the video sources 230. The processors can implement video stability prediction via video stability predictors, video quality assessment via a video quality assessor, as well as perform any number of other processing tasks. Any number of the processors in the pre-processing stage can support the video stability predictor function, the video quality assessor function or similar content delivery metrics.

A pop/cloud region 251A can include a set of virtual clusters 253. Each cluster can be composed of any number and combination of electronic devices including servers, storage devices, networking devices and related devices that make up a cloud computing environment. The virtual clusters 253 can support a set of video processors 255. These video processors 255 can be software components that process the incoming video sources 230 and are hosted by the virtual clusters 253. The video processors 255 can perform tasks associated with each video source 230 to process that video source and can be considered a unit of work or a worker in the video streaming system 200. Each video processor 255 can perform a single task or multiple tasks and can operate in conjunction with other video processors 255 to process the video sources 230. Any number of virtual clusters 253 can manage any number of video processors 255, which together can process any number of video sources 230. Video processors 255 can implement content delivery metrics via a content delivery metric processor 290 (e.g., video stability prediction via video stability predictors or VQA) as well as perform any number of other video processing tasks. While a single video processor 255 is illustrated as providing a content delivery metric processor 290 any number of the video processors 255 can support this function.

Video sources 230 can be any type of video input in any format that is provided by any source device or set of devices. For example, video sources can be provided by a set of content providers, which are sets of devices operated by an entity that produces a video source 230 to be processed by the video streaming system 200. In some cases, the video sources 230 can be provided directly or indirectly by a set of capture devices such as live programming (e.g., sporting events). Any content provider, capture device, or similar set of devices providing the video sources 230 can execute or be in communication with a device executing a content delivery metric processor 290. A content delivery metric processor 290, as further described herein, analyzes a video stream to determine current or near term future metrics (e.g., potential video stream failures or interruptions). This content delivery metric processor 290 process can be implemented at any number and variety of points within the video streaming system 200 such that contextual information about the video can be utilized in making decisions and taking actions associated with the video source 230 by the RCA service 225.

The output of the video processors 255 can be provided to a transcode cluster 257. The transcode cluster 257 can further process the video sources to organize the video sources into a set of channels handled by associated channel nodes 225. The transcode cluster 257 and channel nodes can combine video sources from the video processors 255 and encode the resulting video streams according to the configuration of the respective channels to be distributed to the publishing service cluster 259. A transcode cluster 257 is a set of electronic device resources including servers, storage devices, and networking devices that support any number of channel nodes 225. Similarly, the publishing service cluster is a set of electronic device resources including servers, storage devices, and networking devices that support any number of video streams that are to be published to a content distribution network 274 or in some cases returned to an origin server (e.g., a video source provider or other entity that may publish the video stream). In some embodiments, the transcode cluster 257 can output the video streams as segments and associated metadata. In some embodiments, the publishing service can format the video streams using video encoding formats M3u8, MPD, TS, MP4 and similar video encoding formats. As used herein video, audio/video, and similar terms are used interchangeably to include video formats that may also encompass audio aspects.

A set of content delivery metric processors 290 can be executed at the transcode cluster 257 or between the transcode cluster 257 and the publishing service cluster 259. The content delivery metric processors 290 as described further herein, analyze incoming video stream information to generate a current metric or a prediction metric of the future operation (e.g., VQA or stability) of the video stream. The prediction of future near term stability (e.g., in the range of milliseconds to hours) can be utilized to adjust the handling of the video stream in the video streaming platform 200. For example, if the stability of the video stream is predicted to have high latency or interruption, then the resources devoted to that video stream can be adjusted to maximize their use either by reassignment or by increasing resources to attempt to improve stability by the RCA service 225.

The video streaming system 200 can perform any number of operations to process any number of input video sources 230 and output via a content distribution network 274 to reach any number of consuming devices 227A-N and software applications 229A-N. The operations performed on the video sources 230 can include the corrections of RCA services 225 initiated by issue tracking services 231 of service providers 221 using input from content delivery metric processor 290.

The CDN 274 can be a system of computers networked together across the Internet that cooperates transparently to deliver content, and may include, for example, one or more origin content servers, web servers, cache servers, edge servers, etc. The output data flows may also be delivered to a content playback device directly at the user devices 227A-N. A single output data flow may be delivered to multiple destinations through multicast.

Overall, the streaming platform 200 ingests video sources, transcodes, and transforms the video sources into desired one or more formats for publication and then outputs the resulting video data to user devices 227A-N. The video streaming platform is a distributed architecture using cloud resources, and it is a flexible, scalable, and efficient platform for video processing. The streaming platform may receive input in the form of API calls. The request (may be referred to as a channel creation request) may contain a variety of parameters describing the video source and the expected operations. For example, the request may contain at least one of the following:

- Mandatory parameters describing the type of the video source (e.g., MPEG-2, MPEG-4, H.265, etc.), and location of the video source (e.g., ingest protocol, IP address, URI, etc.).
- Indication of whether and how to enable subtitle processing and/or enable advertisement insertion processing for the video source.
- The desired video and audio transcoding operations (e.g., how many audio/video layers, the desired output characteristics for each such as video frame size/rate and bitrate, the relevant portion of the incoming data flow to use if applicable) for the video source.
- The desired contention protection operations for the published output (e.g., Microsoft© PlayReady, Adobe© Access DRM, AES-128 Encryption for HTTP live streaming, etc.).
- The desired publishing operations to output (e.g., which output format(s) such as HTTP live streaming (HLS), HTTP dynamic streaming (HDS), RTMP, or Microsoft® smooth streaming) to publish, and the destination(s) to send each output format.

Based on the request, the video streaming platform 200 creates media workflows for video sources 2300, utilizing directed graphs of tasks, and each of the so called task graphs are a directed acyclic graph (DAG) of tasks for processing the video source. Each task graph contains tasks to be performed by a worker of the video streaming platform 200. The tasks are then assigned to workers for execution, and the results are included in the output data flows.

The RCA services also can support an API for receiving requests from issue tracking services 233 to identify solutions and implement corrections in the video streaming platform 200. The API can define functions and request formats for input of issues to be resolved. The API may be implemented in the video streaming platform (e.g., as part of the RCA service 225), at the service providers 233, in a distributed manner, or any combinations thereof.

Operations of an RCA Service in a Content Delivery Infrastructure

Content delivery infrastructures (e.g., video streaming platforms) can be established using cloud-based technologies and are relying on data driven decisions. The embodiments present a method of supporting such infrastructures that scales. When support is initiated for a content delivery infrastructure (e.g., a video streaming platform), customer support representatives have to scourge through different issue logging systems and similar repositories to address the issues that arise. A manual RCA process is usually to manually compile an amalgamation of screenshots, texts, and conversations that are logged in a support management system. The embodiments extract knowledge from the collection of issues (sometimes referred to as tickets) in the support management system, apply deep learning and similar machine learning techniques to find the best possible solution and to apply the solution to fix issues with the content delivery infrastructure. The embodiments enable this identification and application of solutions via proper training and input selection techniques for the context of the content delivery infrastructure corrections. As the world moves to more complex and pervasive content delivery infrastructures, the embodiments will help in identifying issues with streaming content in these infrastructures and provide real-time solutions to these issues.

The existing manual processing of issues for content delivery infrastructures is highly dependent on human intervention to fix issues when the delivery of content sources start to degrade in performance and quality. This involves actions by multiple parties on the origination and receiving side of a content delivery source. This process is managed by support personnel researching the root cause and tracking the progress of troubleshooting the issue through a support management system. Once a resolution is found and the issue with a bad content delivery stream is fixed, the resolution is recorded in the support management system with multiple issues and/or resolutions being recorded (e.g., as tickets). As content delivery can have multiple reasons for degraded performance, a large volume of issues and resolutions get created as issues get addressed over time. Whenever a new issue is encountered and a support request is raised, it becomes extremely difficult to search through the vast corpus of previous issues and resolutions to find the most relevant solution for the issue if a similar issue had happened in the past. Search indexing helps partially to find the most relevant solution to an issue if the same issue has been recorded in the support system. But search does not help if a new issue is similar to a previous issue but not an exact match due to actual differences in the technical aspects of the issues or differences in how the issues are described. Secondly, a recorded issue and/or resolution (e.g., a ticket) may contain a lot of information (e.g., error logs, images, semi-structured text, and other artifacts). Basic natural language search does not help in analyzing all of this semi-unstructured data or provide a comprehensive summary relevant to a new issue which is similar to historical issues recorded in the support system. This also leads to duplication of issues and/or resolutions in the system and the added complexity of deduplication. Advanced elastic search and indexing systems can be applied to these issues, but in the context of content delivery these solutions are not very effective for real-time resolution of issues.

The embodiments, use generative pre-trained language transformer models to find the highest probable match to a reported issue in near real-time. These pre-trained language transformer models can be trained on a huge corpus of language constructs and have multi-billion parameters for addressing languages around different domains. The embodiments, leverage these language transformer models to initiate a transfer learning and to train new models for a target content delivery infrastructure. Generating the new models for a target content delivery infrastructure can include configuring the new models to utilize input from content delivery metrics generated from the target content delivery infrastructure. This can involve configuring a layer of the models (e.g., a final layer of the model) for domain shifts pertaining to the specific content delivery infrastructure and metrics that the model is to be utilized with.

The embodiments can utilize explainable AI techniques like Shapley Additive exPlanations (SHAP), DeepSHAP, and other methods to weigh the inputs and their effects on the generation of text by the machine learning models. The process of determining a resolution to an issue can be initiated by user of a service provider or similar entity generating a report of an issue. The user can use a bot or similar application to report a new issue (e.g., to generate a ticket) to troubleshoot issues with a delivery of a content source. The bot or application (e.g., an issue tracker) makes an API call to the RCA service which utilizes the trained machine learning models with the new issue as the input. The machine learning model(s) finds the most relevant historical recorded issues and/or resolution (e.g., tickets, error logs, images, semi-structured text and other artifacts). In some embodiments, the RCA service can provide an auto-generated summary from these issues/resolutions that is sent back to the user through the issue tracker (e.g., via a smart bot or similar application). The results returned from the machine learning models will have the most likelihood score associated with each line item in the results.

The embodiments can also enable a dialog API between the end user and the smart bot or similar issue tracking application. The issue tracking application can leverage the machine learning models to enable the user to troubleshoot the issue quicker when compared to current search solutions. Further embodiments can apply high confidence resolutions without further user input.

The embodiments provide a system that is scalable. The embodiments can be scalable because they are based on advanced AI techniques and novel explainable AI techniques are used with cloud architecture. With explainable AI, the API can be built for software/hardware to interface with the RCA service to provide fully automated or supervised semi-automated solutions to issues around poor performing streaming content delivery (e.g., video streams). The embodiments have benefits including bridging of data from a variety of search indexing approaches, the ability to include unstructured data to predict successful RCA, the ability to scale to learn from a large corpus of semi-structured data using cloud-based frameworks, the ability to automatically identify a solution for a degrading content delivery stream in near real-time. With Explainable AI and rich and deep language constructs, the embodiments allow faster and accurate RCA to fix degrading content delivery streams. In some embodiments, the service provider can integrate an issue tracking application (e.g., a bot) that can be integrated into the service provider communication platform (e.g., a communication platform such as Slack). This provides a rich real-time conversation dialog platform between the user and the embodiments to provide a human-friendly communication platform to solve issues with content sources that have degraded performance and quality.

Figure 3:
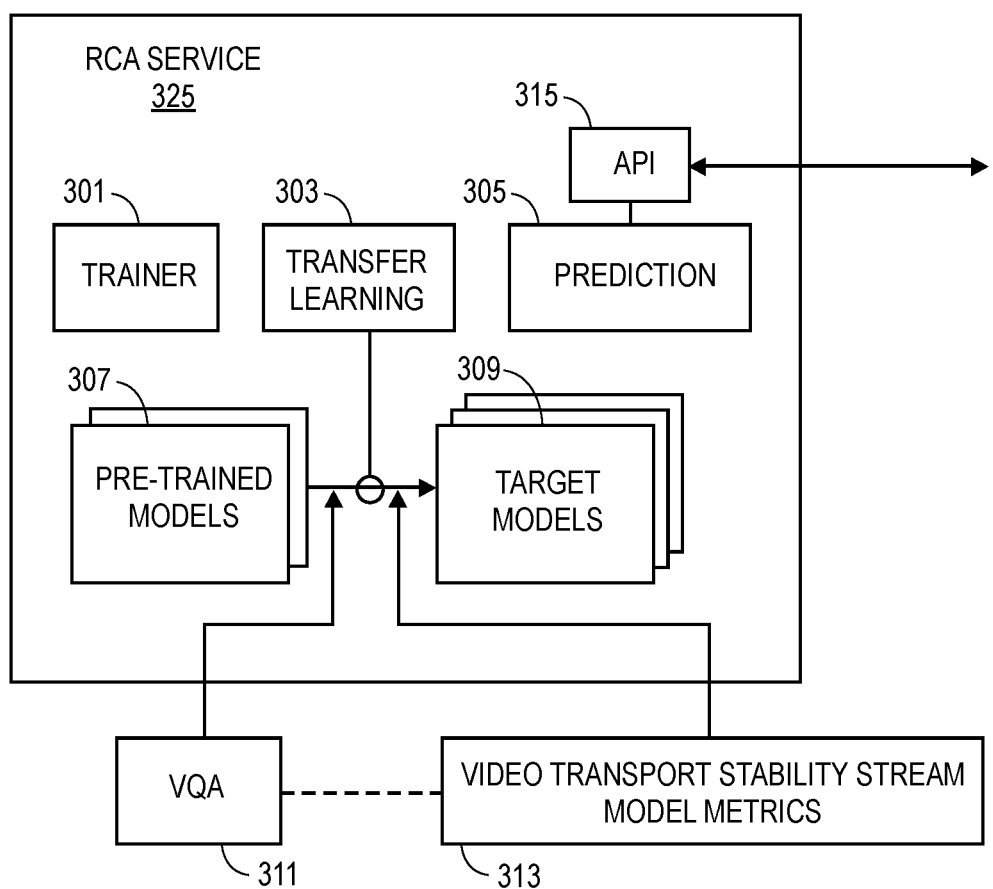
FIG. 3 is a flowchart of one embodiment of a process for root cause analysis training.

FIG. 3 is a diagram of one example embodiment of an RCA service providing issue resolution identification and correction functions. The RCA service 325 can include any combination or organization of a trainer 301, transfer learning 303, prediction 305, and similar functional components. The RCA service 325 can also support an API 315 for interfacing with issue trackers and similar service provider applications. The RCA service 325 can utilize a set of pre-trained language transformer models 307, and target language transformer models 309. These models can be stored and managed by the RCA service 325. In other embodiments, the pre-trained language transformer models 307 and target language transformer models 309 can be stored separate in a separate database or repository and loaded or accessed by the RCA service 325 as needed. In some embodiments, the RCA service 325 can interface with content delivery metrics processors that provide content delivery metrics that indicate the current, past, or predicted status of the content delivery infrastructure. Examples of the content delivery metrics processors can include VQAs 311s, video transport stability stream metrics 313, and similar content delivery metrics and content delivery metric functions.

The trainer 301 can be a function of the RCA service 325 that updates and trains the pre-trained language transfer models 307 using received issue information, resolution information, content delivery metrics, and similar input that can be derived from other content delivery infrastructures or similar sources. The trainer 301 can use this information as input for updating and maintaining the pre-trained language transformer models 307. Any number and variety of pre-trained language transformer models 307 can be utilized that have different input data sets, modeling algorithms, and similar characteristics. The trainer 301 can employ any training techniques for the pre-trained language transformer models including training for neural networks (e.g., generative adversarial training), ensemble methods, classical machine learning methods, and similar artificial learning training methodology, which take a data set with inputs and resolutions and update the model to correlate the inputs with the resolutions such that new inputs can be applied, and a predicted resolution obtained. The pre-trained language transformer models can be re-trained or updated at any frequency depending on availability of additional input training data sets. In some embodiments, as the RCA service 325 or other sources successfully correlate inputs (e.g., metrics and issues) with resolutions, the training data set can be updated and re-applied.

The transfer learning component 303 configures and updates the pre-trained language transformer models to adapt the models to be utilized with the specific set of available inputs for a target content delivery infrastructure. The transfer learning component 303 configures the models to the target content delivery infrastructure by establishing the inputs for the target language transformer models that are available for the target content delivery infrastructure. These inputs can include the available content delivery metrics generated by the target content delivery infrastructure. These available content delivery metrics can include VAQ metrics 311, video transport stability stream metrics 313, and similar content delivery metrics.

The prediction component 305 can receive issue reports via the API 315 or similar interface and apply the received issues to one or more of the target language transformer models 309. In some embodiments a single target language transformer model 309 is available for the target content delivery infrastructure. In other embodiments, multiple target language transformer models 309 can be available and the prediction component 305 can determine which one or more of the target language transformer models to apply to the received issue request. The selection can be based on a categorization or source of the issue request or similar criteria. In other embodiment the issue request can be applied to multiple target language transformer models and the best result (e.g., the result with the highest confidence) can be utilized. When a prediction is initiated by the prediction component 305 this can include the applying of the received issue to the target language transformer models as well as current, recent, or predicted content delivery metrics such as VQA metrics 311, video transport stability stream metrics 313, and similar content delivery metrics.

Figure 4:
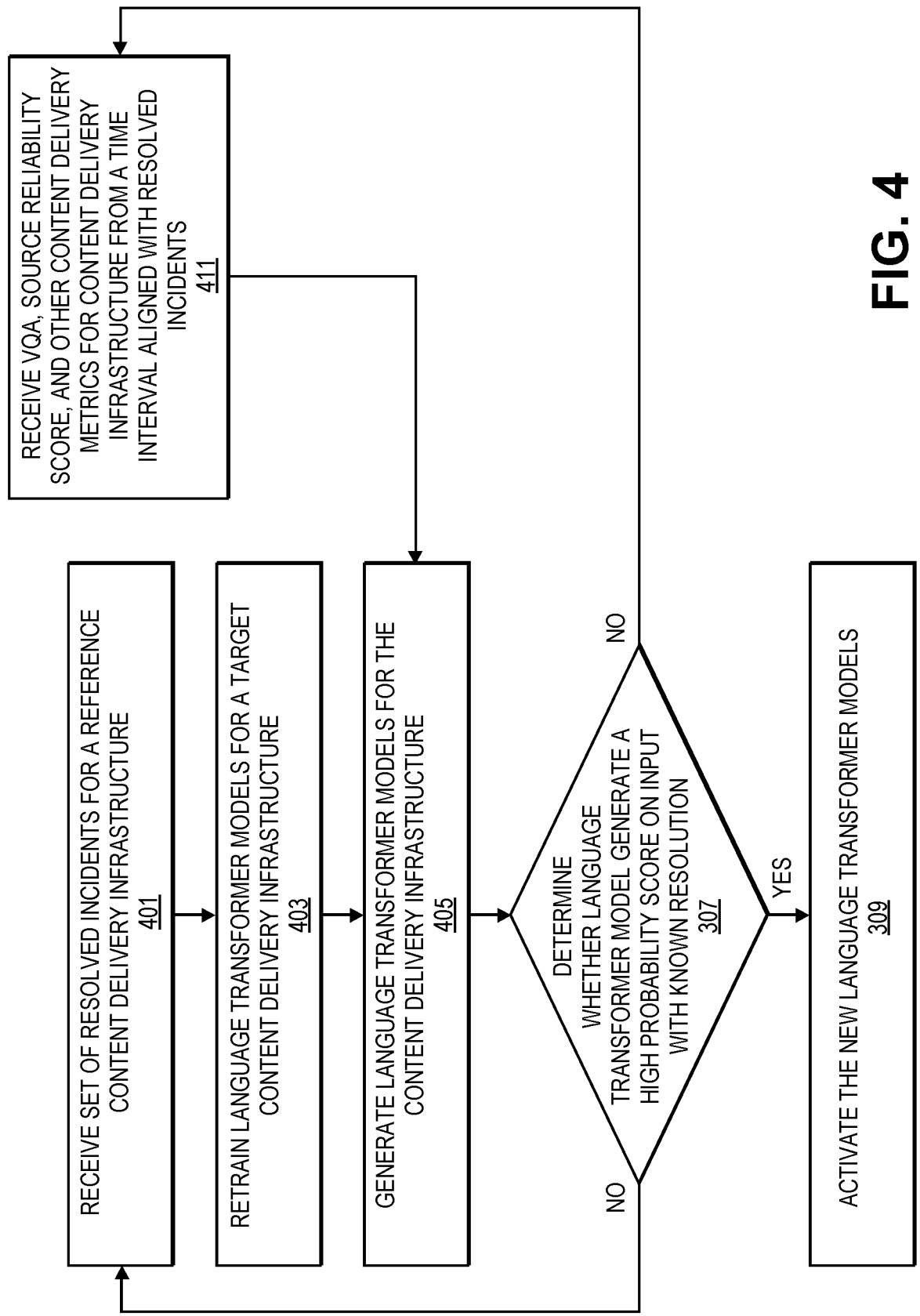
FIG. 4 is a diagram of one embodiment of a root cause analysis service.

FIG. 4 is a flowchart of one embodiment of a process for training a machine learning model to determine a resolution for a reported issue by the RCA service. The illustrated process provides an example process for training language transform models for the RCA service. The process is illustrated at a high level to represent the overall function of the training process. The RCA service receives a set of resolved incidents for a reference content delivery infrastructure (Block 401). The training of the language transform models can be implemented by the training component of the RCA service, or any other component such as a separate training component within the content delivery infrastructure. A reference content delivery infrastructure, as used herein, refers to any content delivery infrastructure including the target content delivery infrastructure. In addition to data sets of resolved incidents, correlated information such as content delivery metrics, reported incidents, resolutions of the incidents, and similar information can be collected by any entity in communication with the RCA service such as an issue tracker of a service provider (Block 411).

Input resolved incidents and correlated information can be processed individually, in sets, batches, or similar groupings. Content delivery metrics that are collected can include latency, packet loss, jitter, bandwidth utilization, and similar metrics, as well as more complex metrics and assessments including VQA, video transport stability stream, and similar metrics. In some embodiments, the geographic location of the path of the content delivery, as well as the timing, date, and medium of the segments of the path can be determined is some embodiments. This information can be correlated with weather patterns, network conditions, properties of the media, bandwidth allocation and similar information that may affect the transmission of the content along the path between the source and destination. In particular, any information that can affect the viability or network conditions of the path and the content delivery stream can be collected. The collected data including metrics, resolutions, and related information can be organized as a time series that can cover any window relative to the current network packet that is being analyzed. To prevent anomalous data from skewing predictions, any or all of the collected data can be smoothed by averaging, exponential smoothing, or similar techniques. For training purposes, the time series data can have a long history to better establish patterns for predicting resolutions of reported issues.

Once the set of resolved incidents and related information is collected (e.g., as time series data), then the set of language transform models can be trained against the collected data (Block 403). The training process can select a set of values of a set of features of the selected collected information which can be varied for the training of the set of language transformation models. In other embodiments, any type of machine learning model can be utilized. In some embodiments, a neural network (e.g., a deep learning neural network, or generative adversarial network (GAN)) or similar machine learning model can be utilized. Each machine learning model can be trained on a different set of features and/or inputs (e.g., different content delivery metrics, and similar features) at any level of granularity. Any provided information about a selected set of resolved incidents can be utilized to train a machine learning model.

Any number of resolved incidents, content delivery metrics, and any other set of features can be selected for use in training each language transformer model. The retraining generates a new trained language transform model (Block 405). The newly generated language transform model can be non-specific to any content delivery infrastructure or be related to a set of reference content delivery infrastructures. The generated language transfer model can then be tested by applying a set of known resolutions and inputs to generate a probability, accuracy, or confidence score based on how closely or with what frequency the generated model matches the known resolutions for the given input set (Block 407).

The probability, accuracy, or confidence score can have a defined range (e.g., 0 to 100) that indicates the level of accuracy or reliability. In some embodiments, the probability or confidence score can be examined to determine whether the applied language transform model requires retraining or whether the generated language transform model can be activated for user (Block 409). If the probability, accuracy, or confidence score of the generated language transform model is below a threshold level or outside or set of boundaries for acceptable probability or confidence levels, then the retraining or updating of the training data sets for the language transform models can be triggered. The retraining of the language transforming model can be similar to the initial training of the language transforming model as described above. The retraining can either update an existing language transforming model or generate a new language transforming model. Retraining can shift the set of features selected for input into the machine learning model. The retraining can be based on updated set of resolved incidents (Block 401) and/or an updated set of correlated content delivery metrics (Block 411).

In some embodiments, after the set of language transformer models is trained a validation process can be performed. The validation process can check whether each language transformer model is operating correctly. Similarly, the language transformer model accuracy can be tested such that those models that have the best performance can be utilized for generating predictions in response to input issue requests. Some language transform models can have confidence ratings that differ for different types of issues and can serves as a basis for selection of the language transform model in the prediction process.

Figure 5:
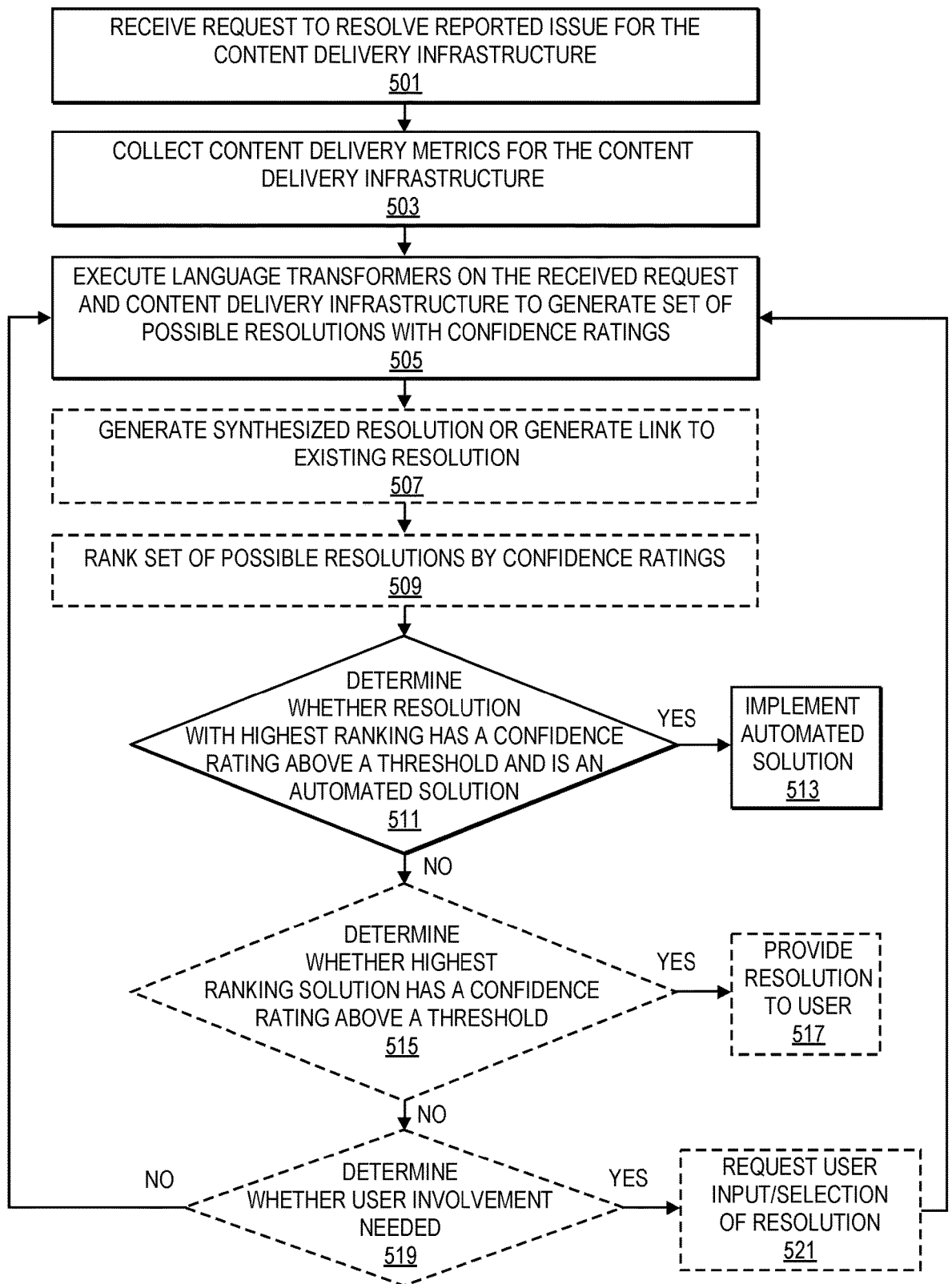
FIG. 5 is a diagram of one embodiment of a root cause analysis prediction process.

FIG. 5 is a flowchart of one embodiment of a process for using a machine learning model such as a language transform model to determine a resolution for a reported issue by the RCA service. This prediction process can be triggered by receiving a (e.g., real-time) request to resolve a reported issue for a target content delivery infrastructure (Block 501). The prediction component can select and load a language transformer model to which the reported issue is to be applied. In response, any content delivery metrics that the selected language transformer model utilizes as input is collected (Block 503). The collected content delivery metrics and received issue from the request are then applied to the selected language transformer models to generate a set of possible resolution with corresponding confidence ratings (Block 505). In some embodiments, the set of possible resolutions is synthesized into a subset of resolutions or links to the existing resolutions are generated (Block 507). A synthesizes resolution can be any combination of two or more existing resolutions that have high confidence ratings for the input issue such that the combination can be applied to resolve the issue. The synthesized resolution can be utilized as a single resolution for future predictions.

The set of possible resolutions can be ranked by the confident ratings with the highest confidence rated resolutions having the highest (best) ranking (Block 509). The process can then check whether any of the resolutions exceed a threshold level that has been configured for determining whether the resolution can be utilized (Block 511). In addition, the check can determine whether the highest ranked resolutions provide an automated solution to the issue (i.e., a solution that can be implemented by the RCA service configuring a setting of a component within the content delivery infrastructure). If an automated solution that exceeds the threshold is available, then the highest ranked solution is selected, and the RCA service configures the components indicated by the automated solution (Block 513).

If an automated solution that exceeds the configured threshold does not exist, then the process can check whether the highest ranked solutions exceed the configured threshold (Block 515). If a non-automated solution that exceeds the threshold is available, then the process selects the highest ranked resolution and send the resolution to the requesting user to be implemented (Block 517). Where the user is interfacing with the issue tracker at the service provider then the resolution can be displayed via an application (e.g., a bot) in an interactive manner such that the user can indicate whether the resolution is successful, and the resolution success or failure can be tracked and utilized for future RCA service model training.

If no resolution in the ranked set of possible solutions exceeds a configured threshold for the confidence ratings, then check can be made as to whether user involvement is needed (Block 519). The determination of user involvement can be configured or based on whether any updated models, content delivery metrics, or similar aspects have changed such that re-executing the process could lead to be higher confidence result. If no change in conditions is detected, then the process can solicit user involvement to review the list of possible solutions and provide input or feedback on the set of possible solutions (Block 521). If a change in conditions is detected, then the process can restart with the execution of a newly selected language transformer models on the updated issue, content delivery metrics, or similar inputs (Block 505). This process can continue to iterate until a resolution with a confidence rating that exceeds the threshold is found.

Electronic Devices Implementing Embodiments of the Invention

Figure 6:
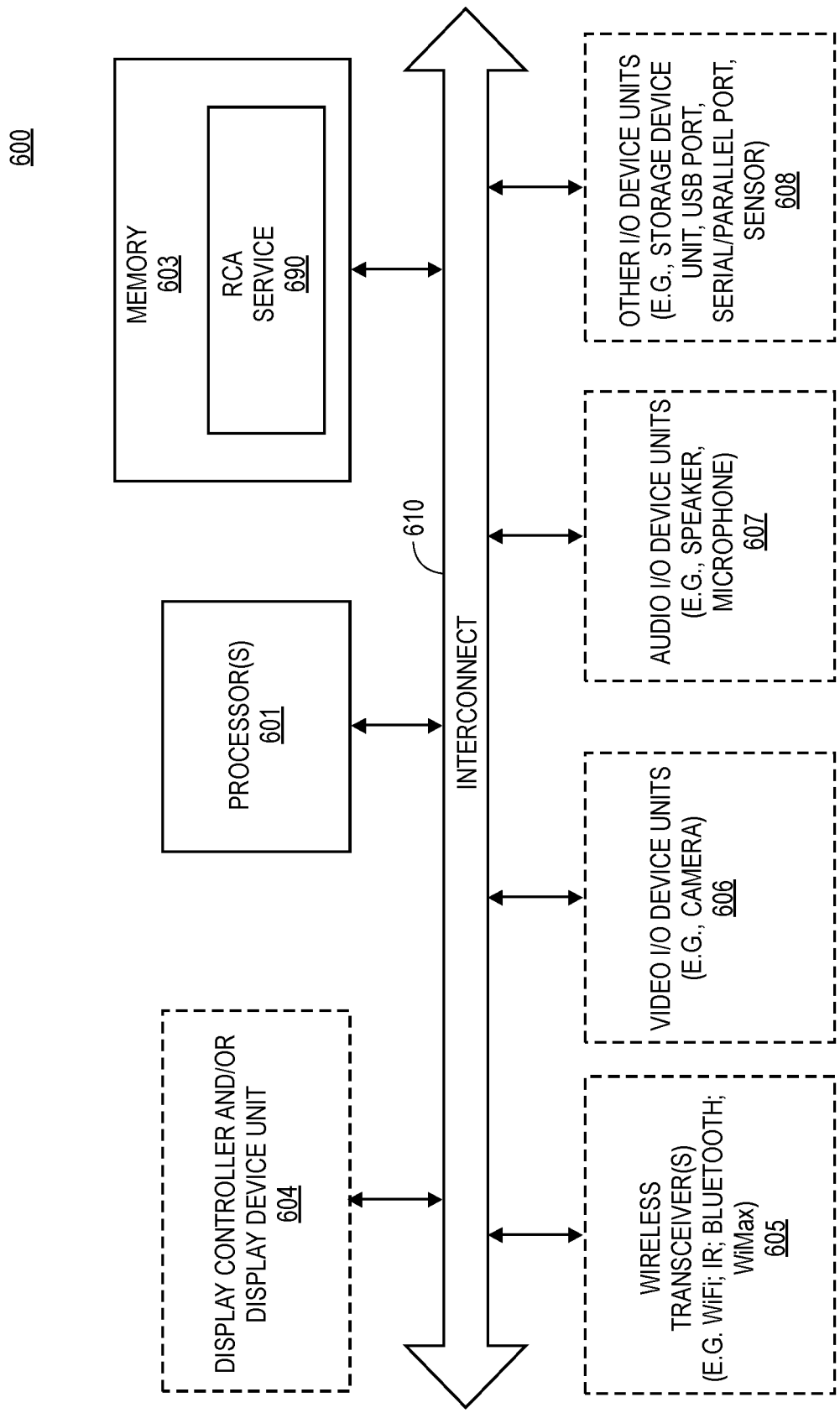
FIG. 6 is a block diagram illustrating an electronic device that may execute any function or part of a root cause analysis service in a content delivery infrastructure in a cloud computing environment according to one embodiment of the invention.

FIG. 6 is a block diagram illustrating an electronic device that may serve as a video stability predictor of a video streaming platform in a cloud computing environment according to one embodiment of the invention. The electronic device may be a computing device (e.g., a computer server) of a cloud computing environment). The system 600 may represent the video stability predictor 690 and or video stability manager described above performing any of the processes or methods for training machine learning models and applying the trained machine learning models to generate context information in real time in a video streaming system described above. The system 600 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 600 is intended to show a high level view of many components of the computing system. However, it is to be understood that additional components may be present in certain implementations and furthermore, different arrangement of the components shown may occur in other implementations.

In one embodiment, the system 600 includes a processor 601, memory 603, and optionally device units 604-608 that are interconnected via a bus or an interconnect 610. A processor 601 may represent a single processor or multiple processors with a single processor core or multiple processor cores included therein. The processor 601 may represent one or more general-purpose processors such as a microprocessor, a central processing unit (CPU), or processing device. More particularly, the processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 601 may communicate with the memory 603, which in an embodiment can be implemented via multiple memory devices to provide for a given amount of system memory. The memory 603 may include one or more volatile storage (or memory) devices such as random access memory (RAM), dynamic RAM (DRAM), synchronous DRAM (SDRAM), static RAM (SRAM), or other types of storage devices. The memory 603 may store information including sequences of instructions that are executed by the processor 601, or any other device units. For example, executable code and/or data of a variety of operating systems, device drivers, firmware (e.g., input output basic system or BIOS), and/or applications can be loaded in the memory 603 and executed by the processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 603 contains a RCA service 690, models, or related components for training the models, which may contain instructions to perform the operations of these components as discussed herein above. The RCA service 690 and related components may contain functional blocks that implement functions as described herein with relation to the RCE prediction process and related training processes discussed herein above. The processor 601 may instantiate the RCA services 690 and related components to perform operations to as discussed herein above.

The system 600 may optionally further include input/output (I/O) devices such as the device units 604-608, including display control and/or display device unit 604, wireless transceiver(s) 605, video I/O device unit(s) 606, audio I/O device unit(s) 607, and other I/O device units 608 as illustrated. The wireless transceiver 605 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 600 may also include an ultrasound device unit (not shown) for transmitting a conference session code.

The video I/O device unit 606 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 607 may include a speaker and/or a microphone to facilitate voice-enabled functions, such as voice recognition, voice replication, digital recording, and/or telephony functions. Other optional devices 608 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 608 may further include certain sensors coupled to the interconnect 610 via a sensor hub (not shown), while other devices such as a keyboard or thermal sensor may be controlled by an embedded controller (not shown), dependent upon the specific configuration or design of the system 600.

The system 600 may be part of a video streaming platform 200 or content delivery infrastructure 100 as illustrated in FIG. 2 and FIG. 1, respectively. Additionally, the system 600 may be integrated within a streaming platform coordinator 170, similar to the RCA services as described herein. The system 600 may perform methods discussed herein above relating to FIGS. 4 and 5.

Note that while the system 600 is illustrated with various components, it is not intended to represent any particular architecture or manner of interconnecting the components; as such details are not germane to embodiments of the present invention. It will also be appreciated that an electronic device having fewer components, or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method of correcting a content delivery infrastructure, the method comprising:
   receiving a request to resolve reported issues for the content delivery infrastructure;
   collecting content delivery metrics for the content delivery infrastructure, in response to receiving the request, the content delivery metrics measuring operations of delivering streaming content in the content delivery infrastructure;
   executing a machine learning model in one or more cloud regions that process the streaming content within the content delivery infrastructure prior to the streaming content reaching a user device, based on input of the request and the content delivery metrics to generate a set of possible resolutions to the reported issues with confidence ratings, wherein executing the machine learning model comprises converting text within the content delivery metrics into numerical values as input to the machine learning model, and wherein the machine learning model is a transformer machine learning model adapted to the content delivery infrastructure based on the content delivery metrics for the content delivery infrastructure; and implementing an automated solution to improve the operations of delivering the streaming content in the content delivery infrastructure based on a resolution from the set of possible resolutions, in response to the resolution having a confidence rating above a threshold.

2. The method of claim 1, further comprising:
generating a synthesized resolution or generating a link to an existing resolution.

3. The method of claim 1, further comprising:
providing the resolution to a user of a service provider in the content delivery infrastructure in response to the resolution having a confidence rating above the threshold that does not have the automated solution.

4. The method of claim 1, further comprising:
providing the set of possible resolutions to a user of a service provider in the content delivery infrastructure in response to the set of possible resolutions not having a confidence rating above the threshold.

5. The method of claim 1, further comprising:
receiving a set of resolved incidents for a reference content delivery infrastructure; and
retraining adversarial machine learning models for a target content delivery infrastructure.

6. The method of claim 5, further comprising:
determining whether a machine learning model for the target content delivery infrastructure generates a high probability score in response to an input with a known resolution.

7. The method of claim 6, further comprising:
receiving video quality assessment, source reliability score, and video stability assessment aligned with the set of resolved incidents and geographic locations of components of the content delivery infrastructure.

8. The method of claim 1, further comprising:
generating a summary of an automated solution that is sent to a user through an issue tracking service;
receiving feedback on the automated solution from the user; and
retraining the machine learning model with the feedback.

9. A non-transitory machine-readable storage medium that provides instructions that, if executed by a processor, will cause the processor to perform operations of a method of correcting a content delivery infrastructure, the operations comprising:
receiving a request to resolve reported issues for the content delivery infrastructure;
collecting content delivery metrics for the content delivery infrastructure, in response to receiving the request, the content delivery metrics measuring operations of delivering streaming content in the content delivery infrastructure;
executing a machine learning model in one or more cloud regions that process the streaming content within the content delivery infrastructure prior to the streaming content reaching a user device, based on input of the request and the content delivery metrics to generate a set of possible resolutions to the reported issues with confidence ratings, wherein executing the machine learning model comprises converting text within the content delivery metrics into numerical values as input to the machine learning model, and wherein the machine learning model is a transformer machine learning model adapted to the content delivery infrastructure based on the content delivery metrics for the content delivery infrastructure; and
implementing an automated solution to improve the operations of delivering the streaming content in the content delivery infrastructure based on a resolution from the set of possible resolutions, in response to the resolution having a confidence rating above a threshold.

10. The non-transitory machine-readable storage medium of claim 9, wherein the operations further comprise:
generating a synthesized resolution or generating a link to an existing resolution.

11. The non-transitory machine-readable storage medium of claim 9, wherein the operations further comprise:
providing the resolution to a user of a service provider in the content delivery infrastructure in response to the resolution having a confidence rating above the threshold that does not have the automated solution.

12. The non-transitory machine-readable storage medium of claim 9, wherein the operations further comprise:
providing the set of possible resolutions to a user of a service provider in the content delivery infrastructure in response to the set of possible resolutions not having a confidence rating above the threshold.

13. The non-transitory machine-readable storage medium of claim 9, wherein the operations further comprise:
receiving a set of resolved incidents for a reference content delivery infrastructure; and
retraining adversarial machine learning models for a target content delivery infrastructure.

14. The non-transitory machine-readable storage medium of claim 13, wherein the operations further comprise:
determining whether a machine learning model for the target content delivery infrastructure generates a high probability score in response to an input with a known resolution.

15. The non-transitory machine-readable storage medium of claim 14, wherein the operations further comprise:
receiving video quality assessment, source reliability score, and video stability assessment aligned with the set of resolved incidents and geographic locations of components of the content delivery infrastructure.

16. An electronic device to implement a method of measuring video stream visual stability, the electronic device comprising:
a non-transitory machine-readable storage medium having stored therein a root cause analysis service; and
a processor coupled to the non-transitory machine-readable storage medium, the processor to execute the root cause analysis service, the root cause analysis service to receive a request to resolve reported issues for a content delivery infrastructure, to collect content delivery metrics for the content delivery infrastructure, the content delivery metrics measuring operations of delivering streaming content in the content delivery infrastructure, to execute a machine learning model in one or more cloud regions that process the streaming content within the content delivery infrastructure prior to the streaming content reaching a user device, based on input of the request and the content delivery metrics to generate a set of possible resolutions for the reported issues with confidence ratings, wherein executing the machine learning model comprises converting text within the content delivery metrics into numerical values as input to the machine learning model, and wherein the machine learning model is a transformer machine learning model adapted to the content delivery infrastructure based on the content delivery metrics for the content delivery infrastructure, and to implement an automated solution to improve the operations of delivering the streaming content in the content delivery infrastructure based on a resolution from the set of possible resolutions, in response to the resolution having a confidence rating above a threshold.

17. The electronic device of claim 16, wherein the root cause analysis service is further to generate a synthesized resolution or generating a link to an existing resolution.

18. The electronic device of claim 16, wherein the root cause analysis service is further to provide the resolution to a user of a service provider in the content delivery infrastructure in response to the resolution having a confidence rating above the threshold that does not have the automated solution.

19. The electronic device of claim 16, wherein the root cause analysis service is further to provide the set of possible resolutions to a user of a service provider in the content delivery infrastructure in response to the set of possible resolutions not having a confidence rating above the threshold.

20. The electronic device of claim 16, wherein the root cause analysis service is further to receive a set of resolved incidents for a reference content delivery infrastructure, and retrain adversarial machine learning models for a target content delivery infrastructure.

21. The electronic device of claim 20, wherein the root cause analysis service is further to determine whether a machine learning model for the target content delivery infrastructure generates a high probability score in response to an input with a known resolution.

22. The electronic device of claim 21, wherein the root cause analysis service is further to receive video quality assessment, source reliability score, or video stability assessment aligned with the set of resolved incidents.

* * * * *